_United States Patent Office_

3,472,669
Patented Oct. 14, 1969

3,472,669
ALUMINOUS MORTAR
Sauveur Ingrassia, Saint-Gilles, Gard, France, and Jean Orsini, Casablanca, Morocco, assignors to Societe Civile d'Etudes et de Brevets "Inor," Monte Carlo, Monaco
No Drawing. Filed Mar. 23, 1966, Ser. No. 536,667
Claims priority, application France, Mar. 25, 1965, 10,617
Int. Cl. C04b 7/32, 19/00
U.S. Cl. 106—104                       7 Claims

ABSTRACT OF THE DISCLOSURE

An aluminous mortar which may be molded without shrinkage comprising an aluminous cement, a detergent and a silicone. The invention comprises a method for forming a non-shrinking molding comprising pouring the aforedescribed mixture into a water-tight open mold made from an electrically non-conductive material, immersing the mold in water until the mixture sets, withdrawing the mold from the water and removing the hardened molding from said mold.

---

This invention relates to an aluminous mortar which can be moulded without shrinkage, and to a process for the production of articles from such mortar. It has hitherto been difficult to make cement mortar articles because such articles must have specific dimensions after drying. When these articles are of simple shapes it is possible approximately to estimate the required shrinkage to be allowed for during moulding, but this is far from being the case for the production of articles of complex shape.

Also, known mortars are frequently porous and readily become impregnated with water, and this has a very adverse effect on their durability.

The object of the invention is primarily to obviate the disadvantages of known mortars. It relates to an aluminous mortar which can be moulded without shrinkage and which consists at least partly of aluminous cement, a detergent and a silicone.

According to one embodiment of the invention, the mortar contains by weight approximately 0.025 to 6 parts of detergent, 0.025 to 4 parts of silicone, 6 to 20 parts of water and 50 parts of cement.

In order to avoid any cracking in the mouldings, the mortar according to the invention may also contain one part of aggregates in addition to the mixture consisting of the cement, detergent, silicone and water. The aggregates preferably consist at least partly of a substance of the group comprising siliceous sand, limestone, marble waste, asbestos, and iron. In one particularly advantageous embodiment of the invention, the mortar contains 30 to 70% by weight of the mixture of cement, detergent, silicone and water, and from 70 to 30% by weight of aggregates.

The cement of the mortar according to the invention advantageously at least partly consists of 1,200 to 1,800° C. refractory cement containing approximately 45 to 75% of Al₂O₃. The limits of this range consist substantially of the commercial cements respectively available as "Fondu Lafarge" (45% of Al₂O₃) and "Secar" (75% of Al₂O₃).

The silicone present in the mortar according to the invention gives the latter water-proofing properties. According to the invention, this silicone is selected from those having a very alkaline pH. By way of example, we may cite amongst known silicones having this feature the silicone sold as a solution in deionised water of a potassium salt of a siliconic acid, under the trade name "Silicone V.M." by Van Malderen S.A., of Paris, and which has a very alkaline pH of about 14.

According to another embodiment of the mortar according to the invention, the detergent is of the Gardinol type, for example as available commercially under the name "Teepol DxD 217," "Teepol DxD 221," "Lensex LE 40," "Pactol."

The invention also relates to a process for the production of mouldings with a mortar as hereinbefore specified, wherein an aqueous solution of detergent and silicone is prepared, the said solution is mixed with cement to form a homogeneous mixture of a consistency midway between that of a very fluid oil and of a thick honey, the said mixed mixture is poured into a water-tight open mould of a material which is electrically non-conductive, the said mould is immersed in water until the mixture sets, the mould is then withdrawn from the water and the hardened article is removed from the mould.

According to one embodiment of the process according to the invention, an aggregate is disposed in the mould before the mixture consisting of cement, detergent, silicone and water is poured into said mould. According to another embodiment of the same process, the aggregate may be added to the mixture consisting of aqueous solution and cement when the said mixture is mixed.

A dye may be added to the aqueous detergent and silicone solution during any stage of the process according to the invention. Diffusion of the dye gives a moulding which is coloured throughout, and this is frequently preferable to surface colouring which is likely to disappear after moulding. Such a dye may, for example, be one of those available under the trade name Viscofil and Artilene.

According to one feature of the process of the invention, moulding is carried out at a temperature preferably of about 15° C., i.e., at the substantially ambient temperature to temperature countries. However, moulding may conveniently be carried out at a temperature between —5 and +40° C.

According to a very advantageous embodiment of the process according to the invention, the immersion time of the mould and its mixture in water is between 8 and 12 hours.

Amongst the numerous embodiments open to those versed in the art, the following example gives one possible practical embodiment. In this example the proportions are given as parts by weight.

EXAMPLE

20 parts of "Silicone V.M.," a solution in deionized water of a potassium salt of siliconic acid having the pH of about 14, and an amount of water to give 1,000 parts of an aqueous mixture, i.e. 780 parts of water, are added to 200 parts of "Teepol," salts of secondary sulfuric acid alkyl esters. The aqueous mixture is mixed at a temperature of 15° C. with cement and aggregates in the proportions of 50 parts of aggregates to 16 parts of aqueous mixture. The resulting mortar is poured into a water-tight open mould of a material which is electrically non-conductive. The mould is immersed in water for 8 to 12 hours until the mortar has set. The mould and moulding it contains are withdrawn and left until the surface of the moulding is dry whereafter the moulding is removed.

Of course the invention is not limited to the example described.

We claim:
1. An aluminous mortar which may be molded without shrinkage consisting essentially of from about 30% to about 70% by weight of an aggregate selected from the group consisting of siliceous sand, limestone, marble, asbestos and iron and from about 70% to about 30% by weight of a mixture consisting essentially of from about 0.025 to 6 parts by weight of a detergent comprising salts of secondary sulfuric alkyl esters, from about 0.025 to about 4 parts by weight of a silicone comprising an alkaline salt of a siliconic acid in deionized water having a pH of about 14, to from about 6 to about 20 parts by weight of water and about 50 parts by weight of an aluminous cement consisting at least partly of a 1,200 to 1,800° C. refractory cement containing 45 to 75% of $Al_2O_3$.

2. A process for producing a non-shrinking molding from a mortar consisting essentially of the steps of preparing an aqueous solution of from about 0.025 to about 6 parts by weight of a detergent comprising salts of secondary sulfuric acid alkyl esters and from about 0.025 to about 4 parts by weight of a silicone comprising an alkaline salt of a siliconic acid in deionized water having a pH of about 14 in from about 6 to about 20 parts by weight of water; mixing said solution with 50 parts by weight of an aluminous cement consisting at least partly of a 1,200 to 1,800° C. refractory cement containing 45 to 75% of $Al_2O_3$ to form a homogenous mixture; pouring said mixture at a temperature of about 15° C. into a water-tight open mold constructed of an electrically non-conductive material; immersing said mold in water for from about 8 to about 12 hours to cause said mixture to set; withdrawing said mold from said water and removing the molding from said mold.

3. A process according to claim 2, wherein an aggregate is disposed in the mould before the mixture is poured into the latter.

4. A process according to claim 2, wherein an aggregate is added to the mixture consisting of the aqueous solution and cement, when the said mixture is mixed.

5. A process according to claim 2, wherein a dye is added to the aqueous detergent and silicone solution.

6. A moulding made from an aluminous mortar according to claim 1.

7. A moulding produced by the process according to claim 2.

References Cited

UNITED STATES PATENTS

| | | | |
|---|---|---|---|
| 1,789,197 | 1/1931 | Séailles et al. | 106—104 XR |
| 2,099,176 | 11/1937 | Scripture | 106—104 |
| 2,322,641 | 6/1943 | Jaros | 106—104 |
| 2,358,776 | 9/1944 | Goldstein | 106—314 XR |
| 2,729,569 | 1/1956 | Lipkind et al. | 106—104 XR |
| 2,887,392 | 5/1959 | Lolley | 106—104 XR |
| 2,760,876 | 8/1956 | Schulman | 106—97 XR |
| 2,772,739 | 12/1956 | Brakel et al. | 106—97 XR |
| 2,813,085 | 11/1957 | MacMullen et al. | 106—90 XR |
| 3,042,535 | 7/1962 | Hiltrop et al. | 106—97 XR |
| 3,215,549 | 11/1965 | Ericson | 106—90 |

TOBIAS E. LEVOW, Primary Examiner

H. M. S. SNEED, Assistant Examiner

U.S. Cl. X.R.

106—314